(12) United States Patent
Clüsserath

(10) Patent No.: US 10,196,253 B2
(45) Date of Patent: Feb. 5, 2019

(54) CONTAINER TREATMENT MACHINE AND METHOD FOR SUPPLYING AND DISCHARGING CONTAINERS TO AND FROM THE CONTAINER TREATMENT MACHINE

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 200 days.

(21) Appl. No.: 15/126,761

(22) PCT Filed: Feb. 12, 2015

(86) PCT No.: PCT/EP2015/052918
§ 371 (c)(1),
(2) Date: Sep. 16, 2016

(87) PCT Pub. No.: WO2015/139888
PCT Pub. Date: Sep. 24, 2015

(65) Prior Publication Data
US 2017/0088409 A1   Mar. 30, 2017

(30) Foreign Application Priority Data
Mar. 18, 2014   (DE) .................. 10 2014 103 671

(51) Int. Cl.
| | | |
|---|---|---|
| B65G 47/86 | (2006.01) | |
| B67C 7/00 | (2006.01) | |
| B08B 9/20 | (2006.01) | |
| B29C 49/42 | (2006.01) | |
| B65B 35/24 | (2006.01) | |
| B65G 47/84 | (2006.01) | |

(52) U.S. Cl.
CPC ............ *B67C 7/0046* (2013.01); *B08B 9/205* (2013.01); *B29C 49/4205* (2013.01); *B65B 35/243* (2013.01); *B65G 47/846* (2013.01); *B65G 47/847* (2013.01); *B65G 2201/0235* (2013.01); *B65G 2201/0247* (2013.01)

(58) Field of Classification Search
CPC ............... B67C 7/0046; B65G 47/846; B65G 2201/0235; B65B 35/243; B08B 9/205; B29C 49/4205
See application file for complete search history.

(56) References Cited

FOREIGN PATENT DOCUMENTS

| | | |
|---|---|---|
| DE | 33 00 814 | 7/1984 |
| WO | WO02/49829 | 6/2002 |
| WO | WO2010/013201 | 2/2010 |
| WO | WO2010/099957 | 9/2010 |

*Primary Examiner* — Jason K Niesz
(74) *Attorney, Agent, or Firm* — Occhiuti & Rohlicek LLP

(57) ABSTRACT

A container-treatment machine having plural treatment stations for treating containers includes a transport element that rotates about a vertical machine axis, thereby moving the treatment stations circumferentially. A first transfer star supplies untreated containers simultaneously to corresponding treatment stations that are next to each other in the circumferential direction. A second transfer star removes treated containers simultaneously from corresponding treatment stations.

19 Claims, 4 Drawing Sheets

CONTAINER TREATMENT MACHINE AND METHOD FOR SUPPLYING AND DISCHARGING CONTAINERS TO AND FROM THE CONTAINER TREATMENT MACHINE

RELATED APPLICATIONS

This is the national stage entry under 35 USC 371 of international application PCT/EP2015/052918, filed on Feb. 12, 2015, which claims the benefit of the Mar. 18, 2014 priority date of German application DE 102014103671.9, the contents of which are herein incorporated by reference.

RELATED APPLICATIONS

The invention relates to container treatment, and in particular, to transferring containers in and out of a container-treatment machine.

BACKGROUND

Known container treatment machines include a transport element that is driven to rotate about a vertical machine axis. A first transport star supplies untreated containers to this machine. A second transport star removes containers that have been treated from the container-treatment machine.

A disadvantage of this is that providing separate transfer stars for the supply and discharge of the containers creates a loss angle within which no container treatment can take place. This impairs the container-treatment machine's throughput.

SUMMARY

According to a first aspect, the invention relates to a container-treatment machine. The container-treatment machine comprises a transport element that rotates about a vertical machine axis and that comprises a plurality of treatment stations for treating containers, a first transfer star for supplying the untreated containers to the transport element and a second transfer star for discharging the treated containers from the transport element. The first transfer star is configured in such a way and also arranged relative to the transport element so that untreated containers are supplied two at a time to two treatment stations that succeed one another in the circumferential direction of the transport element. The second transfer star is also configured in such a way and arranged relative to the transport element so that treated containers are discharged two at a time from two treatment stations that succeed one another in the circumferential direction of the transport element. The arrangement of the first and/or second transfer star is preferably selected so that the transport paths on which the normal axes of the containers are moved by the transfer stars overlap with the transport path on which the normal axes of the containers are moved through the transport element. The simultaneous supplying of two containers to the transport element and the simultaneous discharging of two containers from the transport element means that the container-treatment machine can be operated with a higher throughput and that the loss angle between the first and second transfer star can be minimized. A further reduction in the loss angle of the container-treatment machine can be achieved by overlapping the first and second transfer star.

In one embodiment, the first transfer star for supplying two untreated containers is configured so that two untreated containers are simultaneously positioned beneath two successive treatment stations in a single supply step. The first transfer star preferably comprises a plurality of peripherally arranged container receptacles, also referred to as transfer star container receptacles, with two containers held in the container receptacles being simultaneously moved to transfer positions in a single supply step, i.e. a rotation of the first transfer star by an angular amount, for example an angular amount of between 90° and 180°, and with one transfer position being beneath one treatment station of the transport element. A pitch of the first transfer star is preferably matched to a machine pitch of the transport element such that the distance between two successive treatment stations equals the distance of two successive container receptacles of the first transfer star.

In a further embodiment, the first transfer star is associated with a first lifting device whereby both untreated containers are simultaneously transferred to the treatment stations of the transport element by being lifted from transfer positions into treatment positions. The first lifting device can comprise holding means that encompass the container to be lifted at least partly, for example, in its neck region. Alternatively the first lifting device can be provided beneath the container as the latter stands with its base on the lifting device. The first lifting device can, in particular, be a hydraulically or pneumatically actuated lifting device. The first lifting device can also be provided at a fixed location.

In a further embodiment, the second transfer star for discharging two treated containers is configured such that one transfer star container receptacle of a pair of transfer star container receptacles is positioned vertically beneath one treatment station of a pair of successive treatment stations. A pitch of the second transfer star is preferably matched to a machine pitch of the transport element such that the distance between two successive treatment stations equals the distance of two successive container receptacles of the second transfer star. This means that two treated containers can be simultaneously taken from the treatment stations and placed in the container receptacles located underneath them.

In a further embodiment, the second transfer star is associated with a second lifting device by which a simultaneous transfer of both treated containers from the treatment stations of the transport element to transfer star container receptacles of the second transfer star is effected by lowering down the treated containers from the treatment positions into transfer positions. The second lifting device is preferably configured analogously to the first lifting device. It can also be held together with the first lifting device on a common support structure or on a common frame. The second lifting device can, for example, comprise holding means that encompass the container to be lowered at least partly, for example in its neck region. Alternatively the second lifting device can be provided beneath the container as the latter stands with its base on the lifting device. The second lifting device can, in particular, be a hydraulically or pneumatically actuated lifting device. The second lifting device can also be provided at a fixed location.

In a preferred embodiment, the supplying and/or discharging of the containers by the first and second transfer star is effected on a first height level and the treatment of the containers at the treatment stations is effected on a second height level lying above the first height level. This allows the container pairs that are to be supplied and/or discharged to be first arranged by the first or second transfer star beneath a pair of treatment stations on transfer positions and then transferred by being lifted up to the treatment stations. The difference in height between the level on which the containers are supplied and discharged and the treatment level on which the container treatment takes place allows an almost independent rotating of the transfer stars and transport element. Preferably, the untreated containers are raised from the first height level to the second height level by the first lifting device and the treated containers are lowered from the second height level to the first height level by the second lifting device.

In a preferred embodiment, the treatment stations comprise means for holding the containers in the raised position. Here, the holding means can be formed by locking devices that bring about a holding of the container by its neck region or mouth region. The holding means can be designed in the manner of a detent and configured to engage behind projections or ridges. The holding means can be hydraulically or pneumatically actuated. The containers are preferably held by the holding means in a position pressed up against the respective treatment station on the transport path between the first and second transfer stars.

It is preferable if the transport element and the first and second transfer star are configured so that they can be driven independently of one another. The drive can be formed by servo motors for example. An optimized overall operation of the container-treatment machine can be achieved as a result.

In one embodiment, the transport element and the first and second transfer stars are configured so they can at least in part be alternately indexed or intermittently driven. Simultaneous standstill phases of the transport element and of the first and/or second transfer star are achieved as a result of the indexed drive. These standstill phases are used, for example, to transfer a container pair from the first transfer star to treatment stations of the transport element or to transfer a container pair from treatment stations of the transport element to the second transfer star.

In one embodiment, the lifting device, or holding means provided on the lifting device, is configured so as to be able to travel radially relative to the normal axis of the container. After a container pair has been supplied to the transfer positions, this allows the lifting device or holding means to be brought from a retracted position, in which the holding means is at a distance from the containers, to an advanced position, in which the holding means at least partly encompasses the containers around their periphery. As a result, it is possible to bring about a collision-free entry and/or exit of the containers to the transfer positions.

In a further embodiment, the supplying and discharging of the containers to/from the first and second transfer star is brought about by way of a single transporter which runs beneath the transfer stars. The transporter can be formed for example by a circulating conveyor belt, a circulating conveyor chain, a screw conveyor or suchlike transport devices. It is preferable if the transporter that performs the supplying and discharging of the containers is configured as a straight line, i.e. the supplying and discharging of the containers takes place in the same spatial direction to enable the supplying and discharging to be realized with a minimum of technical complexity and effort.

The container-treatment machine is configured preferably as a filling machine, as a cleaning and/or disinfection machine, or as an inspection machine. The treatment stations that are provided on the transport element can be filling stations, cleaning and disinfecting stations or inspection stations.

The invention also relates to a method for supplying and/or discharging containers to/from a container-treatment machine comprising a transport element that rotates about a vertical machine axis and that has a plurality of treatment stations for treating containers, a first transfer star for supplying the untreated containers to the transport element, and a second transfer star for discharging the treated containers from the transport element. This involves simultaneously supplying two untreated containers to two treatment stations succeeding one another in the circumferential direction of the transport element and simultaneously discharging two treated containers from two treatment stations succeeding one another in the circumferential direction of the transport element.

Containers, in the sense of the invention, are, for example, bottles, cans or similar receptacles made from any material that is suitable for the purpose, in particular glass, plastic or metal. Containers in the sense of the invention can in also include PET kegs, for example large-volume receptacles made from a plastic material and having a volume of 10 liters, 20 liters, or 30 liters.

Any machines with which a container treatment can be carried out, for example filling machines, cleaning machines, inspection machines or machines for providing the containers with decor features, are container-treatment machines in the sense of the invention.

Any mounts suitable for holding and/or guiding the containers on or opposite the transfer star are to be understood as recesses in the sense of the invention. In particular recesses can also be part of holding and fixing elements arranged around the periphery of the transfer star and used to fix the respective containers on the transfer star. The holding and fixing elements can, in particular, form a detent mount for the containers and/or be gripper-like in configuration. An outer guide that prevents an outward radial deviation of the containers can be dispensed with in this way.

For the purpose of the invention, the expressions "essentially", "in essence" or "around" mean variations from the respective exact value by +/−10%, preferably by +/−5% and/or variations in the form of changes insignificant for the function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description. The invention is explained in detail below through the use of embodiment examples with reference to the figures.

DETAILED DESCRIPTION

Figure 1:
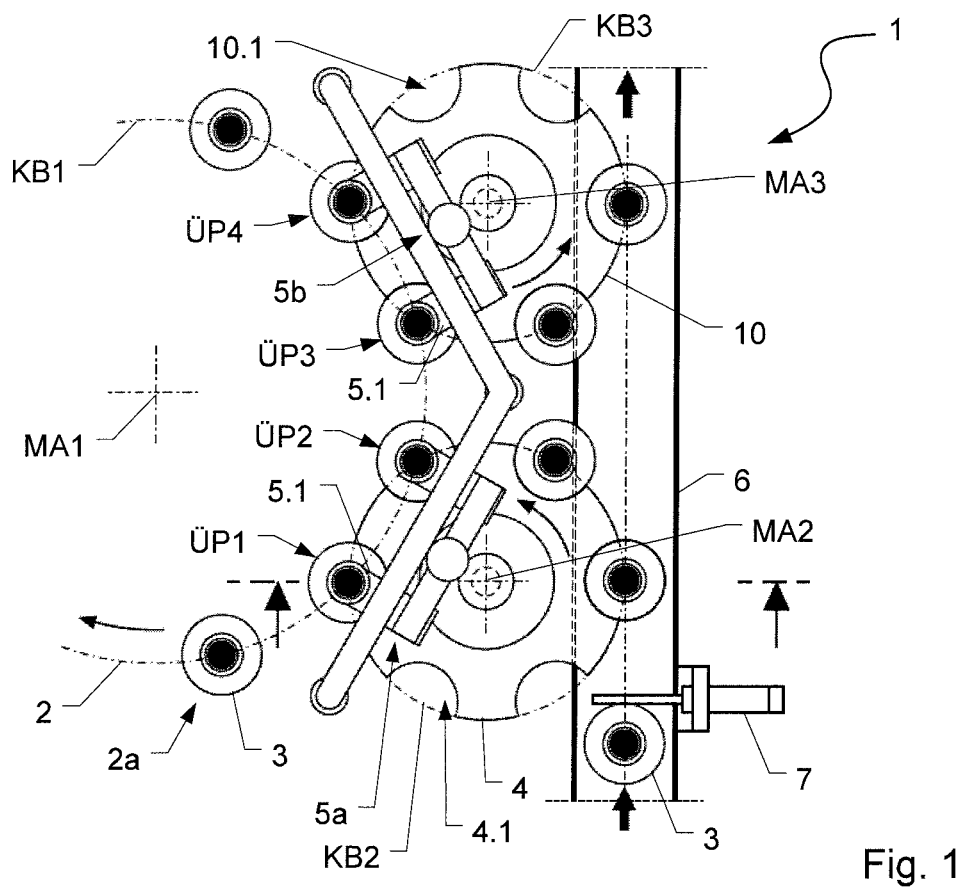
FIG. 1 shows a plan view of a container-treatment machine.
Figure 2:
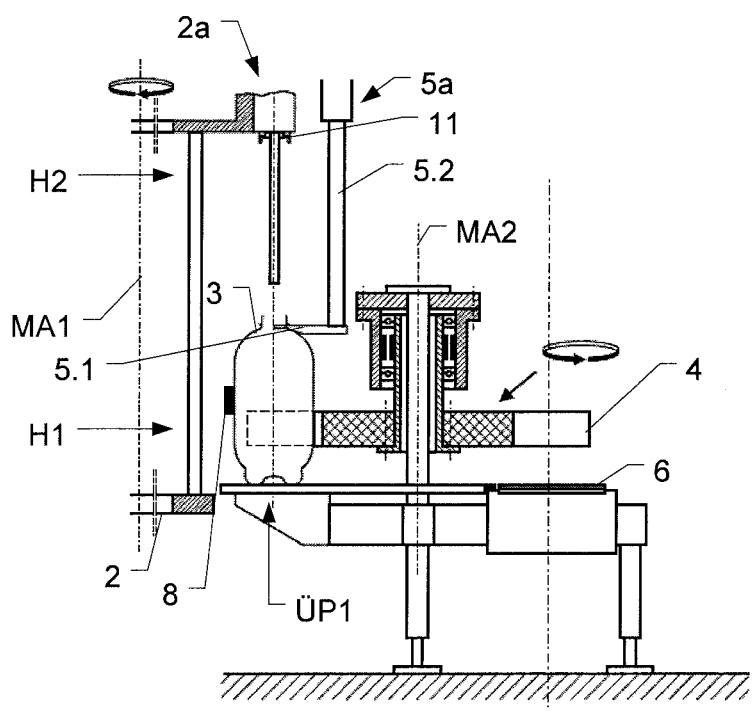
FIG. 2 shows the container-treatment machine of FIG. 1 in a sectional view along section A-A.

FIGS. 1 and 2 show a container-treatment machine 1 having a transport element 2 that rotates about a vertically extending first machine-axis MA1. The container-treatment machine 1 has treatment stations 2a where container treatment takes place. These treatment stations 2a are arranged around the periphery of the transport element 2. In the illustrated embodiment, the container-treatment machine 1 is a filling machine. The treatment stations 2a are thus filling elements for filling containers 3 with a product. Alternatively, the container-treatment machine 1 can be a cleaning and/or disinfection machine or an inspection machine.

The container-treatment machine 1 includes a first transfer star 4 and a second transfer star 10. The first transfer star 4 interacts with a transporter 6 to supply containers 3 to the treatment stations 2a. The second transfer star 10 discharges treated containers 3 from the transport element 2 and towards the transporter 6.

In the illustrated embodiment, the transporter 6 is a linear conveyor that is at least in part guided beneath the first and second transfer stars 4, 10, i.e. beneath an operating space through which the transfer stars 4, 10 convey containers 3. Examples of linear conveyors include conveyor belts or chains. In other embodiments, the transporter 6 is a screw conveyor.

In the illustrated embodiment, a single transporter 6 both supplies and discharges containers 3. However, other embodiments feature one transporter for supplying containers 3 and another transporter for discharging containers 3.

The first transfer star 4 has container receptacles 4.1 that are arranged about its periphery. These container receptacles 4.1 entrain containers 3. In some embodiments, the container receptacles 4.1 are recesses that are provided about the periphery of first transfer star 4. The recesses receive containers 3 over at least part of their circumference. As a result, the container receptacle 4.1 entrains a container 3 by partially encompassing it.

As shown in FIG. 1, the transporter 6 feeds upright containers 3 to a stopper 7. The stopper 7 executes a time-indexed release or forwarding of containers 3 to the first transfer star 4. As a result, the stopper 7 enables the time-indexed forwarding of a queued container 3 in such a way that the queued container 3 is conveyed by the transporter 6 into a container receptacle 4.1 of the first transfer star 4.

The first transfer star 4 is driven to rotate about a second machine axis MA2 that runs parallel to the first machine axis MA1. As the transfer star 4 rotates about the second machine axis MA2, the recess 4.1 entrains the container 3 conveyed into it by the transporter 6 through an angular amount as the transfer star 4.

The container receptacles 4.1 of the first transfer star 4 are filled with the containers 3 in such a way that at least two container receptacles 4.1, which succeed one another along the periphery, are filled with containers 3. These containers 3, form a container pair. Each container in the container pair is subsequently supplied to corresponding first and second transfer positions ÜP1, ÜP2.

Referring now to FIG. 2, an outer guide 8 prevents radial deviation of the containers 3 as the first transfer star 4 moves them. The outer guide 8 encircles the first transfer star 4 at a radial distance away from it and at least over a partial circular path.

A suitable drive, such as a servo motor, cyclically drives the first transfer star 4. This feeds containers 3 held in the container receptacles 4.1 to the corresponding first and second transfer positions ÜP1, ÜP2 intermittently or in timed cycles.

Referring back to FIG. 1, the transport element 2 conveys containers about a first circular path KB1 and the first transfer star 4 conveys containers about a second circular path KB2. The first and second circular paths KB1, KB2 intersect at two points. The first and second transfer positions ÜP1, ÜP2 are preferably located at these intersections. When a container 3 is at a transfer position ÜP1, ÜP2, its container axis passes through one of these intersection points.

The transfer star 4 conveys containers 3 to the transfer positions ÜP1, ÜP2 two at a time. As a result, the containers 3 of a container pair are always fed simultaneously to the first and second transfer positions ÜP1, ÜP2. This method of supplying containers results from the indexed rotation of the first transfer star 4.

A pair of treatment stations 2a is synchronized so that it is located at the first and second transfer positions ÜP1, ÜP2 at the correct times. These treatment stations 2a are aligned, preferably centrally, on the intersection points of the first and second circular paths KB1, KB2. When properly aligned, the first treatment station of the pair is located above the first transfer position ÜP1 and the second treatment station of the pair is located above the second transfer position ÜP2.

Referring to FIG. 2, the container treatment device 1 further includes one or more lifting devices 5a at the transfer positions ÜP1, ÜP2. In some embodiments, a common first lifting device 5a serves both the first and second transfer positions ÜP1, ÜP2. In such embodiments, the common first lifting device 5a lifts containers 3 present at the first and second transfer positions ÜP1, ÜP2 simultaneously.

The first lifting device 5a is vertically displaceable along a direction that is parallel to the first machine axis MA1. It is preferable that the first lifting device 5a be permanently mounted on the container-treatment machine 1.

In some embodiments, the first lifting device 5a comprises a holder 5.1 that is configured to at least partly encompass an untreated container 3. In the illustrated embodiment, the holder 5.1 is a neck-ring holder that at least partly encompasses a container's neck along a path beneath the container's neck ring.

In other embodiments, the holder 5.1 includes at least one gripper. Particular ones of these embodiments have a pincer formed by two gripper elements that can move relative to one another. When closed, the pincer at least partly encompass the untreated container 3.

In those embodiments that have a common first lifting device 5a for two containers 3, the first lifting device 5a can be implemented by a pair of holders 5.1. In these embodiments, a common lifting rod or on a common lifting cylinder 5.2 supports the holders 5.1.

In operation, the first transfer star 4 delivers a pair of containers 3 at a delivery level H1. The first lifting device 5a, and in particular, a holder 5.1 thereof, lifts the pair of containers 3 from the delivery level H1 to a treatment level H2. In the process, the containers 3 move from the first and second transfer positions ÜP1, ÜP2 to corresponding treatment positions such that one container 3 at a time is arranged at a treatment station 2a. In the illustrated embodiment, the lifting operation draws the containers 3 out of the container receptacles 4.1 of the first transfer star 4. In those embodiments in which the treatment stations 2a include filling elements, a filling tube associated with the filling element enters the container's interior through its mouth.

After the containers 3 have been lifted up to the treatment level H2, they are then locked at the treatment station 2a. As a result, the treatment station 2a itself holds the containers.

In some embodiments, a locking device 11 holds the container 3 at the treatment station 2a. The locking device 11 can be controlled in such a way that, after the container 3 has been lifted up to the treatment level H2, one or more locking elements grip the container's mouth region. This fixes the container's position relative to the treatment station 2a. With the containers 3 now held solely by locking devices 11, the first lifting device 5a can then be lowered.

Once the pair of containers has been lifted, the transport element 2, together with the untreated containers 3, rotates about the first machine axis MA1 in indexed cycles. The filling operation begins once the container 3 is pressed up against the appropriate treatment station 2a.

As shown in FIG. 1, the second transfer star 10 discharges treated containers 3 from the transport element 2 to the transporter 6. The second transfer star 10 rotates about a vertical third machine axis MA3 that runs parallel to the first and second machine axis MA1, MA2.

The second transfer star 10 is configured identically with the first transfer star 4. As was the case with the first transfer star 4, the second transfer star 10 has container receptacles 10.1 arranged about its periphery for entraining containers 3. In some embodiments, the container receptacles 10.1 are recesses in the periphery of the otherwise disc-shaped transfer star. Each recess engages a container 3 over at least part of its circumference. This partially encompasses the container 3, thus entraining it.

In a similar manner to that discussed in connection with the first transfer star 4, the second transfer star 10 defines a third circular path KB3 that intersects the first circular path path KB1 at two points.

The arrangement of the first and second transfer stars 4, 10 relative to one another is preferably selected such that a first treatment station 2a comes to rest in the region of a container receptacle 4.1 of the first transfer star 4 and a second treatment station immediately succeeding the first treatment station 2a comes to rest in the region of a container receptacle 10.1 of the second transfer star 10. In other words, the arrangement of the first and second transfer stars 4, 10 relative to one another is selected so that no treatment station 2a comes to rest between the first and second transfer star 4, 10 during standstill phases of the cyclically driven transport element 2 and the first and second transfer stars 4, 10. This arrangement significantly reduces the loss angle in which no container treatment can take place.

After the first transfer star 4 has supplied containers 3 to the transport element 2, the transport element 2 treats the containers 3 at corresponding treatment stations 2a. The transport element 2 then supplies the containers 3 to the second transfer star 10, which acts as a discharge star.

At the second transfer star 10, a second lifting device 5b lowers a pair of containers 3 from the treatment level H2, which is the level at which containers 3 are treated, to the delivery level H1, which is the level at which the second transfer star 10 discharges the containers 3. The second lifting device 5b has a pair of holders 5.1. In some embodiments, these are neck ring grippers. In some embodiments, the holders 5.1 at least partly encompass the neck regions of corresponding containers 3. In other embodiments, the holder 5.1 is a pincer that includes at least two gripper elements that can move relative to one another. When closed, the pincer at least partly encompasses a treated container 3.

In some embodiments, the second lifting device 5b includes either a lifting rod or a common lifting cylinder 5.2. The holder 5.1 is either on the lifting rod or on the common lifting cylinder, as the case may be. As a result, the holder 5.1 is able to travel vertically.

The indexed rotation of the transport element 2 and that of the second transfer star 10 is synchronized in such a way that the second lifting device 5b simultaneously transfers two treated containers 3 into the two corresponding container receptacles 10.1 of the second transfer star 10 that have been moved into position at the first and second transfer positions ÜP3, ÜP4. The second transfer star 10, is preferably configured in such a way that, when the transport element 2 and the second transfer star 10 are both at a standstill, two successive container receptacles 10.1 of the second transfer star 10 come to rest beneath two successive treatment stations 2a of the transport element 2.

While both the transport element 2 and the second transfer star 10 are at a standstill, the holder 5.1 of the second lifting device 5b engages the treated containers 3, the locking device 11 releases, and the second lifting device 5b lowers the holder 5.1 to transfer the treated containers 3 to the transfer star 10. The holder 5.1 of the second lifting device 5b then disengages from the containers 3. Further indexed rotation of the second transfer star 10 then brings the containers 3 to the transporter 6. The transporter 6 then feeds the containers 3 to a further treatment station, such as a bottle capper.

The transport element 2 rotates by an angular amount such that the treatment stations 2a that were just in the region of the second transfer star 10 come to rest above the first transfer star 4. As a result, untreated containers 3 can again be positioned at the treatment stations 2a. In some embodiments, the transport element 2 is indexed to rotate by an angular amount that is twice the machine pitch. This corresponds to twice the angle between two successive treatment stations 2a.

The particular embodiment illustrated in FIG. 1 carries out the supply and discharge of containers 3 across the space between the first and second transfer stars 4, 10. In this embodiment, the first and second transfer stars 4, 10 rotate in the same direction and the transport element 2 rotates in the opposite direction. In particular, as shown in FIG. 1, the first and second stars 4, 10 rotate counter-clockwise whereas the transport element 2 rotates clockwise.

Figure 3:
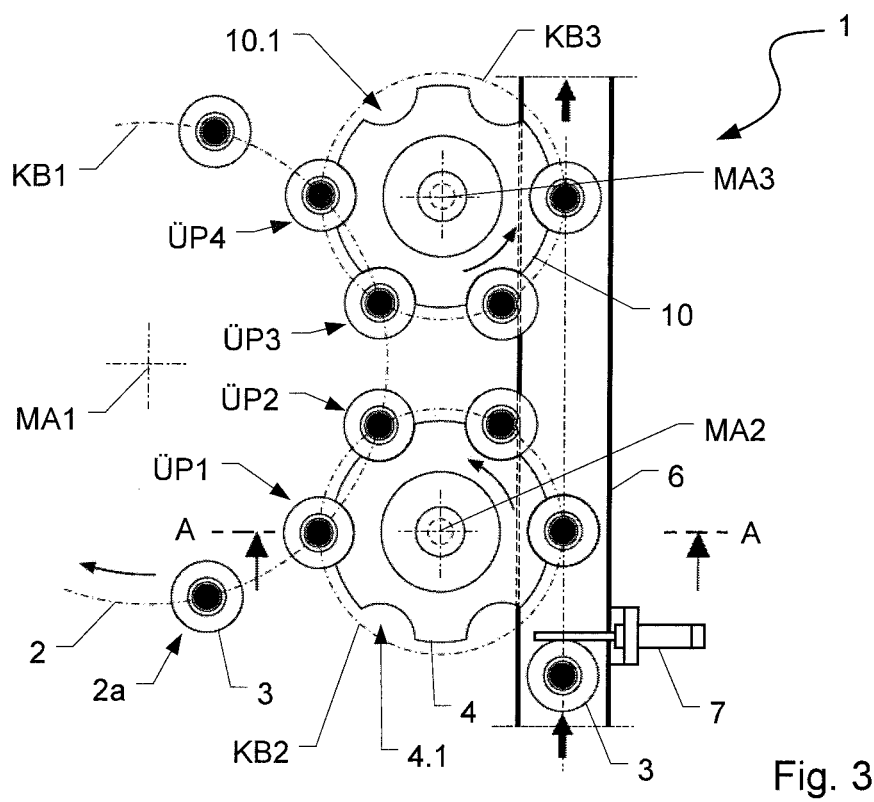
FIG. 3 shows a plan view of a second embodiment of the container-treatment machine.
Figure 4:
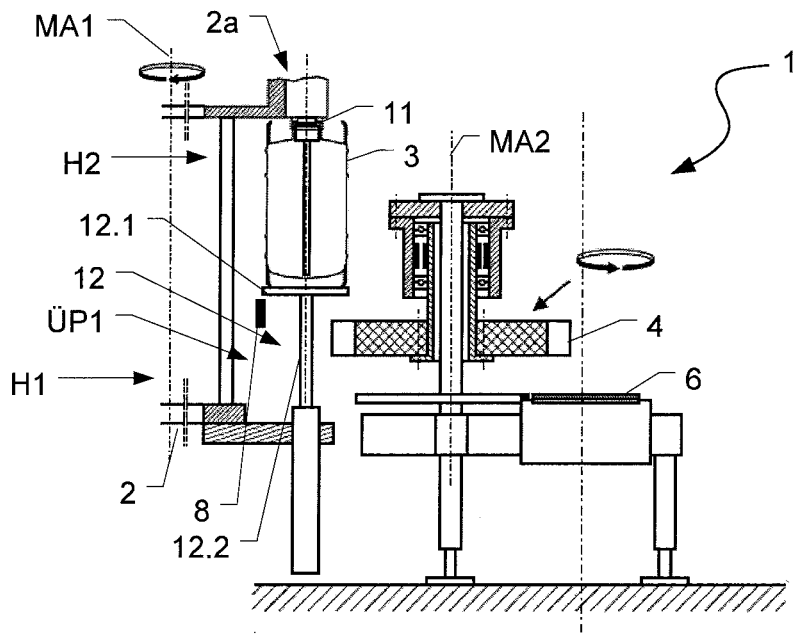
FIG. 4 shows the container-treatment machine of FIG. 3 in a sectional view along section A-A.

FIGS. 3 and 4 shows a second embodiment of a container-treatment machine 1 that avoids having lifting devices 5a, 5b that at least partly encompass containers 3 in the neck region. In this second embodiment, a hoist-type lifting device 12 supports the untreated container 3 by its base. The lifting device 12 has one or more dishes 12.1 that form a set-down area for the containers 3. A lifting cylinder 12.2 engages the underside of a dish 12.1 and thereby lifts or lowers the dish 12.1.

Both the first and second transfer star 4, 10 have a lifting device 12. The lifting device 12 of the first transfer star 4 lifts the container 3 from the delivery level H1 up to the treatment level H2. The lifting device 12 of the second transfer star 10 lowers container 3 from the treatment level H2 to the delivery level H1.

In some embodiments, the lifting devices 12 at the transfer stars 4, 10 simultaneously lift and lower two containers 3. When in its lowered position, the dish element 12.1 forms a sliding surface that is located on the same level as the other sliding surfaces that convey containers 3 to the dish 12.1 or that remove containers from the dish 12.1 through the rotation of respective transfer star 4, 10.

Figure 5:
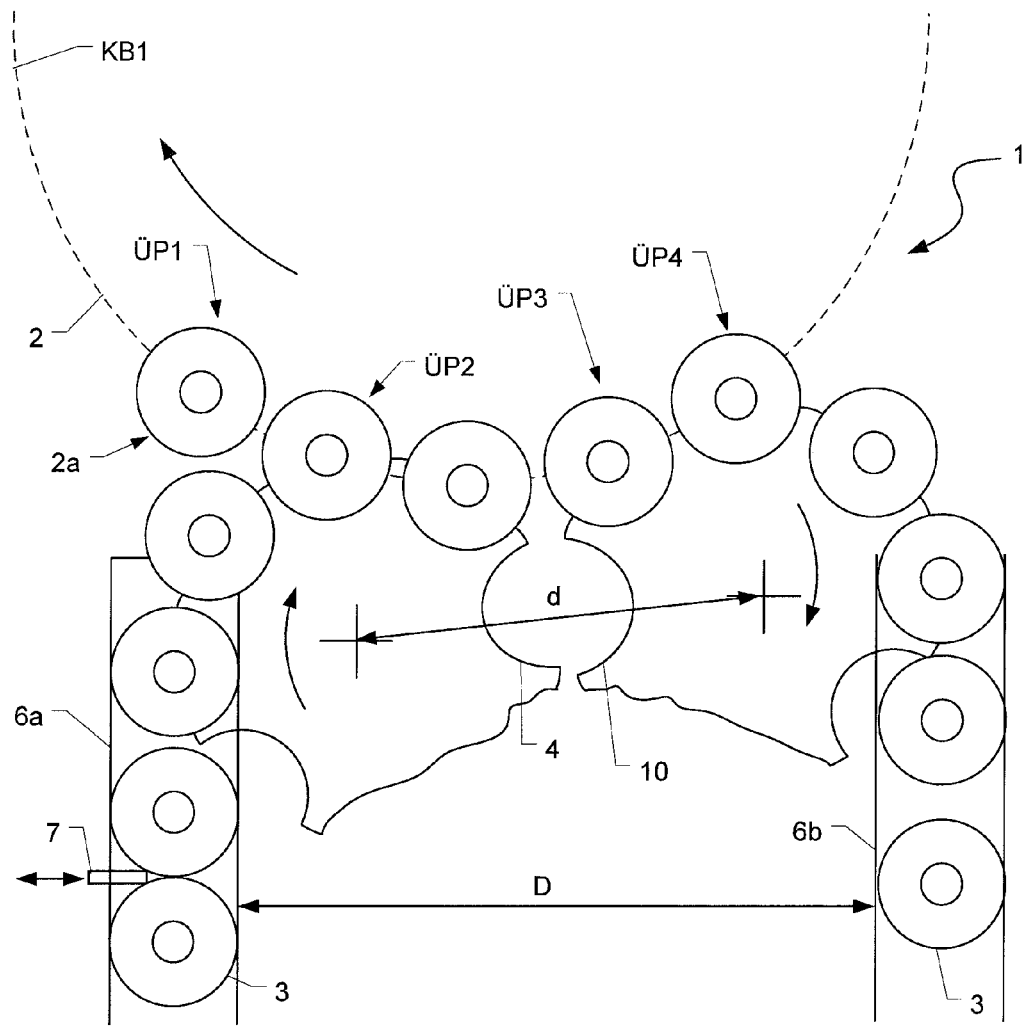
FIG. 5 shows a plan view of a third embodiment of container-treatment machine in a third embodiment.

FIG. 5 shows a third embodiment of the container-treatment machine 1. Unless otherwise noted below, the statements made above relating to the previous embodiments apply.

Unlike the previous embodiments, instead of one transporter 6 running through beneath the transfer stars 4, 10, the third embodiment has first and second transporters 6a, 6b.

The first transporter 6a supplies untreated containers 3 to the first transfer star 4 and the second transporter 6b discharges the treated containers 3 from the second transfer star 10. The first and second transporter 6a, 6b are arranged relative to the first and second transfer stars 4, 10 in such a way that the supplying and discharging of the containers is effected through the peripheral regions of the transfer stars 4, 10, which face away from one another. The transporters 6a, 6b run parallel to, and at a distance from one another, with a first distance D between the transporters 6a, 6b being greater than a second distance d between the second and third machine axes MA2, MA3.

By avoiding the conveying of containers 3 through the space between the first and second transfer stars 4, 10, the second distance d, and hence the distance between the first and second transfer stars 4, 10 can be considerably reduced. This, in turn, reduces the container-treatment machine's loss angle.

Figure 6:
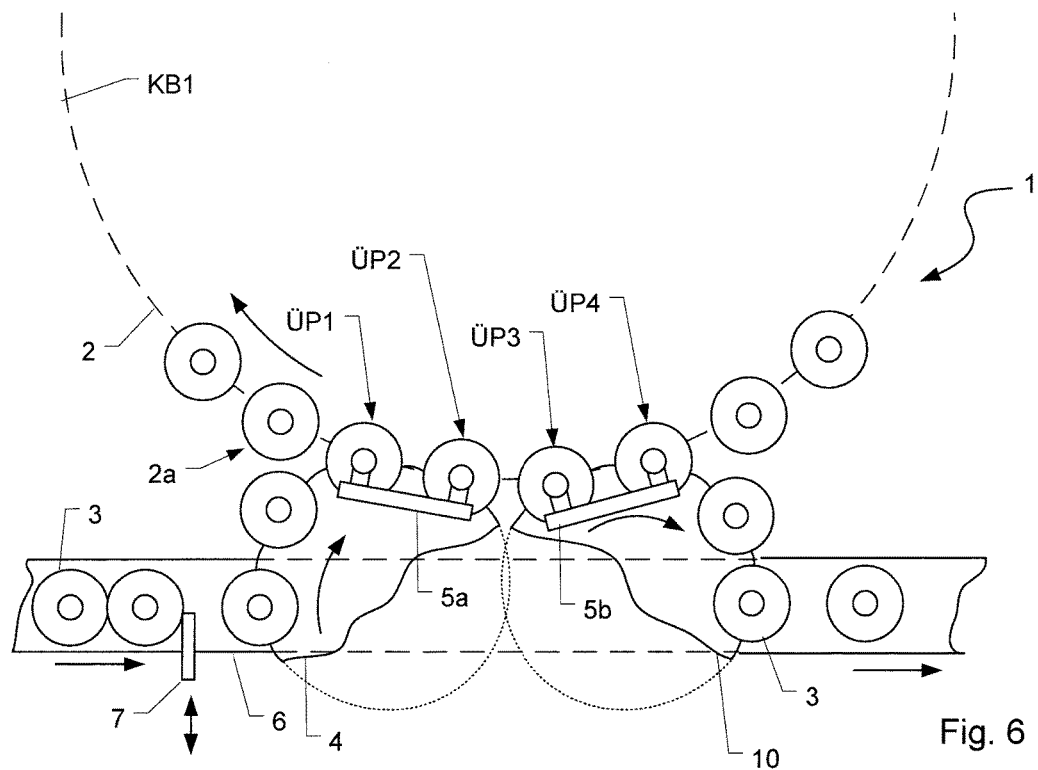
FIG. 6 shows a plan view of a container-treatment machine in a fourth embodiment.

FIG. 6 shows a further embodiment of a container-treatment machine 1. This embodiment is essentially the same as the embodiment shown in FIGS. 1 and 2, so only the differences between the embodiments are explained below. Otherwise, the description of the previous embodiments also applies to this embodiment.

Like the embodiments according to FIGS. 1 to 4, the embodiment shown in FIG. 6 has a continuous transporter 6 that supplies and discharges containers. The essential difference between this and the embodiments according to FIGS. 1 to 4 is that the supplying and discharging of containers 3 takes place through the peripheral regions of the transfer stars 4, 10 facing away from one another. The supplying of the containers 3 to the first transfer star 4 occurs in an essentially radial direction relative to the first transfer star 4 and towards the second machine axis MA2. Similarly the discharging of containers 3 from the second transfer star 10 occurs in an essentially radial direction away from the third machine axis MA3.

Avoiding the conveying of containers 3 through the space between the first and second transfer stars 4, 10 reduces the second distance d and hence the distance between the transfer stars 4, 10. This reduces the container-treatment machine's loss angle. In particular it is also possible to provide an overlap between the transfer stars 4, 10.

Figure 7:
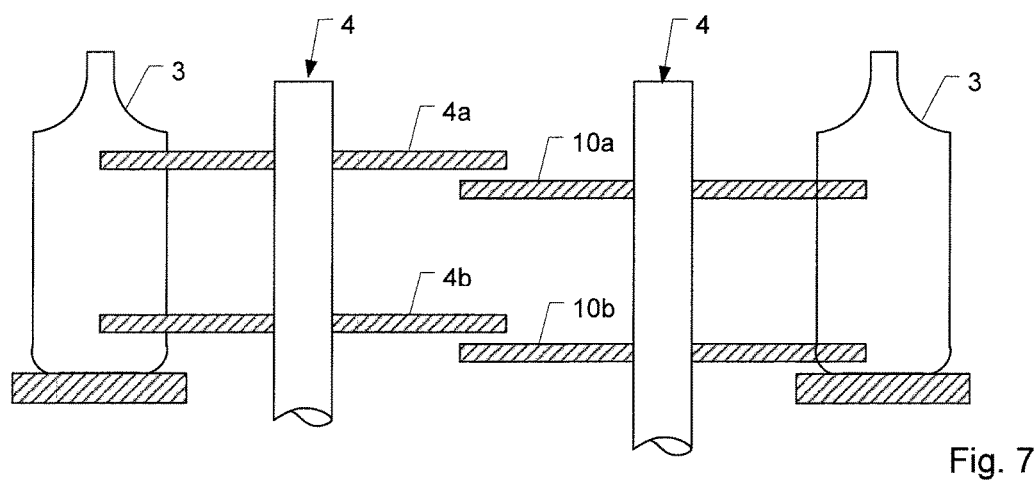
FIG. 7 shows a side view of an overlapping arrangement of two transfer stars.

FIG. 7 shows such an overlap between first and second transfer stars 4, 10. Each transfer star 4, 10 has a plurality of guide levels. In the illustrated embodiment, each transfer star has two guide levels 4a, 4b, 10a, 10b. The corresponding guide levels 4a, 10a and 4b, 10b are at different heights. This makes collision-free overlap between transfer stars 4, 10 possible. However the transport levels on which containers 3 move through the first and second transfer stars 4, 10 lie on a common level.

In the preceding embodiments, at least one transporter 6, 6a, 6b is used for supplying untreated containers 3 and for discharging treated containers 3. It is on the other hand also possible for the treated container to be conveyed to someplace other than a transporter 6 that discharges it directly to another container-treatment machine.

The invention claimed is:

1. An apparatus comprising a container-treatment machine, said container-treatment machine comprising a transport element, a plurality of treatment stations, a first transfer star, a second transfer star, a first transfer position, a second transfer position, and a first lifting device, wherein said transport element rotates about a vertical machine-axis, wherein said treatment stations are configured to treat containers, wherein said plurality of treatment stations rotates with said transport element, wherein said first transfer star supplies untreated containers to said transport element, wherein said second transfer star discharges treated containers from said transport element, wherein said first transfer star is configured in such a way that two untreated containers are simultaneously supplied to first and second treatment stations from said plurality of treatment stations, wherein said first and second treatment stations succeed one another in a circumferential direction of said transport element such that no treatment station is present between said first and second treatment stations, wherein said first lifting device is associated with said first transfer star, and wherein said first lifting device is configured for simultaneously lifting two untreated containers from said first and second transfer positions to said treatment stations.

2. The apparatus of claim 1, wherein said first transfer star is configured such that said two untreated containers are simultaneously positioned beneath said first and second treatment stations in a single supply step.

3. The apparatus of claim 1, wherein said first lifting device is stationary.

4. The apparatus of claim 1, wherein said second transfer star comprises first and second transfer-star receptacles and wherein said second transfer star is configured such that said first transfer-star receptacle is positioned vertically beneath said first treatment station and said second transfer-star receptacle is positioned vertically beneath said second treatment station.

5. The apparatus of claim 1, further comprising a second lifting device, wherein said second lifting device is associated with said second transfer star, wherein said second lifting device is configured to simultaneously transfer first and second treated containers to container receptacles of said second transfer star, wherein said second lifting device is configured to simultaneously lower first and second treated containers from said first and second treatment stations of said transport element to said first and second transfer positions.

6. The apparatus of claim 5, wherein said second lifting device is stationary.

7. The apparatus of claim 1, wherein said first transfer star comprises first recesses around a periphery thereof, said first recesses configured to operate as container receptacles for engaging untreated containers that are to be supplied, and wherein said second transfer star comprises second recesses around a periphery thereof, said second recesses comprising container receptacles, said second recesses being configured to operate as container receptacles for engaging treated containers to be discharged.

8. The apparatus of claim 1, further comprising a delivery level and a treatment level above said delivery level, wherein supply of containers by said first transfer star takes place on said delivery level, wherein treatment of containers at said treatment stations takes place on said treatment level, and wherein discharge of containers by said second transfer star takes place on said delivery level.

9. The apparatus of claim 8, further comprising a second lifting device, wherein said first lifting device lifts untreated containers from said delivery level to said treatment level, and wherein said second lifting device lowers treated containers from said treatment level to said delivery level.

10. The apparatus of claim 1, wherein said treatment stations each comprise a holder for holding containers in a raised position.

11. The apparatus of claim 1, wherein said transport element is configured to be driven independently of said first transport star, wherein said first transport star is configured to be driven independently of said second transport star, and wherein said second transport star is configured to be driven independently of said transport element.

12. The apparatus of claim 1, wherein said first transport star is configured to alternately be indexed and intermittently driven, wherein said transport element is configured to alternately be indexed and intermittently driven, and wherein said second transfer star is configured to alternately be indexed or intermittently driven.

13. The apparatus of claim 1, further comprising a second lifting device, wherein each of said first and second lifting devices comprises a neck-ring holder configured to at last partially encompass a container beneath a neck ring thereof.

14. The apparatus of claim 1, further comprising a second lifting device, each of which is configured to transport containers in a vertical direction, wherein said first lifting device is configured to travel radially relative to a vertical axis of a container arranged at said first lifting device, and wherein said second lifting device is configured to travel radially relative to a vertical axis of a container arranged at said second lifting device.

15. The apparatus of claim 1, further comprising a transporter running beneath said first and second transfer stars, wherein said transporter supplies untreated containers to said first transfer star and receives treated containers discharged from said second transfer star.

16. The apparatus of claim 1, wherein said treatment stations comprise filling stations.

17. The apparatus of claim 1, wherein said treatment stations comprise inspection stations.

18. The apparatus of claim 1, wherein said treatment stations comprise cleaning stations.

19. A method for operating a container-treatment machine that comprises a transport element that rotates about a vertical machine axis and that has a plurality of treatment stations for treating containers, a first transfer star for supplying untreated containers to said transport element, a first lifting device associated with said first transfer star, a first transfer position, a second transfer position, and a second transfer star for discharging treated containers from said transport element, said method comprising supplying untreated containers to corresponding treatment stations that succeed one another in a circumferential direction of said transport element, causing said first lifting device to simultaneously lift two untreated containers from said first and second transfer positions to said treatment stations, and discharging treated containers from corresponding treatment stations that succeed one another in said circumferential direction of the transport element, wherein said untreated containers are supplied simultaneously to said corresponding treatment stations, and wherein said treated containers are discharged simultaneously from said corresponding treatment stations.

* * * * *